Oct. 22, 1957    J. W. SHEFFER ET AL    2,810,336
APPARATUS FOR FINISHING SURFACES OF ARTICLES
Filed Sept. 20, 1951      7 Sheets-Sheet 1

INVENTORS
JOHN W. SHEFFER
EDMUND A. WATSON
BY
*George R. Ericson*
ATTORNEY

INVENTORS
JOHN W. SHEFFER
EDMUND A. WATSON
BY
George R. Ericson
ATTORNEY

INVENTORS
JOHN W. SHEFFER
EDMUND A. WATSON
BY

*George R. Erieson*
ATTORNEY

United States Patent Office 2,810,336
Patented Oct. 22, 1957

2,810,336

APPARATUS FOR FINISHING SURFACES OF ARTICLES

John W. Sheffer, Williamsport, Pa., and Edmund A. Watson, Ridgewood, N. J., assignors to ACF Industries, Incorporated, a corporation of New Jersey Application September 20, 1951, Serial No. 247,488

1 Claim. (Cl. 98—115)

This invention relates to spraying systems and the method of controlling overspray and fumes, and is particularly adapted for use in spray-painting or coating relatively large objects such as railroad cars, buses and the like.

In conventional practice, it is customary to run the cars or other vehicles to be sprayed through a shed or large stationary booth past one or more spraying stations. This necessary movement of the cars to and from the spraying stations is obviously an expensive operation. In addition, due to the large working zone the spray is not sufficiently confined to the area of application, resulting in overspray and fumes incident to the spraying operation being spread over a wire area. This condition is not only injurious to workmen breathing the contaminated and fume-laden air, but also constitutes a fire hazard in the paint shop or shed.

Relatively small movable hoods serving only to exhaust overspray and fumes have also been used in systems for spraying railway cars. An undesirable feature of such systems is that spraying equipment or apparatus, such as hoses, pressure tanks, etc. it scattered along the floor over a wide area as the exhaust hood is moved during progress of the spraying operation. Another disadvantage of the above mentioned systems is that the exhaust of overspray and air upsets the desired temperature conditions required for the best painting results because of the excessive volume of air that must be drawn from the area surrounding the hoods.

It is an object of this invention to provide a moving, self-contained spraying system for coating railroad cars and the like in which the spray is confined substantially to the exact area of application and the overspray and fumes completely and quickly exhausted.

Another object of the invention is to provide a moving or traveling spray booth having a running valve connection for maintaining continuous communication between the space within the booth and an exhaust outlet during movement of the booth.

Still another object of the invention is to provide a driven paint spray booth having an open side with detachable and adjustable means around its perimeter adapting it to substantially conform to the contour and size of the object to be sprayed.

A further object of the invention is to provide a moving booth which is power-driven at a predetermined selected speed during the spraying operation.

A still further object of the invention is to provide a booth having an elevator platform whereby the upper portions of the vehicle may be sprayed simultaneously with the lower portions by workmen carried within the booth.

Yet another object of the invention is the provision of a moving booth adapted to carry one or more workmen and all necessary equipment and apparatus for paint spraying.

A further object of the invention is to provide an improved method of confining and disposing of overspray and fumes in a spray-painting operation.

These and other objects of the invention will be apparent to those skilled in the art from the following description taken with the accompanying drawings in which.

Referring now more in detail to the drawings, a railway car C is shown on track T in position for spray application of paint or similar coating, or any other fluid with which the car is to be treated. A spray booth B is mounted and driven along each side of the car during the painting operation.

The booth B has a base structure 6 and an overhanging roof structure 7 arranged to partially embrace the car or other object to be sprayed. The framework of the booth includes upright channels 8 joined together by top inner and outer horizontal channels 9, inner base channels 10, outer upper and lower base channels 11, 12, respectively and intermediate channels 13. A floor plate 14, formed with openings through which the upright channels 8 extend, is supported on the inner base channels 10 and outer upper base channels 11. The marginal portions 15 of the floor plate extend beyond the upright channels 8 and the floor plate covers the base structure 6 of the booth. The top outer channels 9 at the ends of the booth are extended forwardly and tied together by a similar channel 16 to form the frame for the overhanging roof structure 7. A top plate 17 of the roof structure is mounted on top channels 9 and channel 16 and is preferably provided with air inlet louvres 18 in the overhanging portion of the structure when necessary to clear overspray and fumes from the upper area of the booth. The booth framework is covered by sheet metal or similar panels 19 forming a closed side, panels 20 forming the end walls, panel 21 forming the front wall of the overhanging roof srtucture and panel 94 forming the front wall of the projecting under portion secured to floor 14 and at its ends to extensions 40 of the end panels.

The base structure 6 of the booth includes the lower portion of upright channels 8, inner and outer base channels 10, 11, which project laterally beyond the upright channels under floor 14 and top cover plate 15, and lower base channels 12, which extend only between the upright channels 8. A supporting truss structure is formed by a pair of spaced longitudinally extending plates 22 at the outer side of the base portion and another pair of more widely spaced plates 23 at the inner side of the base 6. All of these longitudinal plates extend the full length of the base structure beyond the upright channels 8 beneath the floor 14 and base cover plate 15, except the inner of plates 23 which extends only between opposite upright channels and outer base channels 11, 12. The plates are fitted around and secured to base channels 10, 11, 12, to floor 14 and base cover plate 15 by longitudinally extending angle bars 24, 25 and additionally to the base channels by angle pieces 26, forming a rigid supporting truss structure. The ends of the base portion are closed by end walls 27 secured to upright angle bars 28 connected at the ends of angle bars 24, 25 and to top cover plate 15 by horizontal angles 29, the bottom of the base being reinforced by outer channels 30.

The booth is mounted on wheels 32 running on rails 34 secured on flooring 35 and extending parallel with and alongside the car C mounted on rails T. The wheels at the outer side of the booth are journalled between the plates 22 and at the inner side on axle brackets 36 secured to the outer of plates 23.

The end walls 20 of the booth have forwardly projecting upper end portions 38 and forwardly projecting bottom end portions 40. These projecting wall portions are so arranged and of such dimensions as to embrace or envelop in spaced relation thereto the outer surface of vehicles of varying smaller contours. End profile plates 42 of substantially the same contour as the surface to be sprayed are detachably connected by fasteners 44 to the edges of the forwardly extending wall portions 38 and end walls 20. These profile plates do not entirely close or span the space between the end walls 20, wall portions 38, 40 and the surface being sprayed, but are of such size as to be spaced slightly from the said surface when in operative position. The space below the bottom edge of the front wall 21 of top portion 7 and the surface being sprayed is partially closed by an upper adjustable profile plate 46 preferably formed of rubber. This plate 46 is slidable in guideways 48 on the upper wall portions 38 and is held in any one of a plurality of adjusted positions to accommodate the contour of the vehicle to be sprayed by means of a pin 50 passing through aligned holes in the plate and guideways. The profile plates are spaced a desired but relatively short distance from the car side wall and form an opening through which paint is sprayed on the car.

Figure 3:
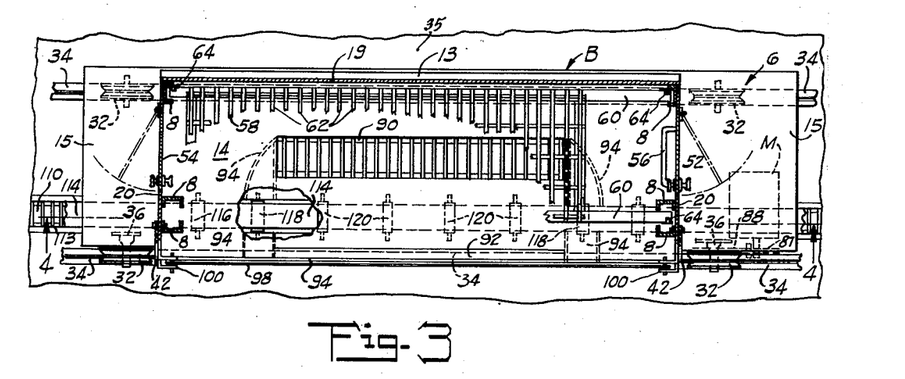
Figure 3 is a sectional view taken on line 3—3 of Figure 2, a portion of the structure being broken away to more clearly disclose other parts thereof.
Figure 4:
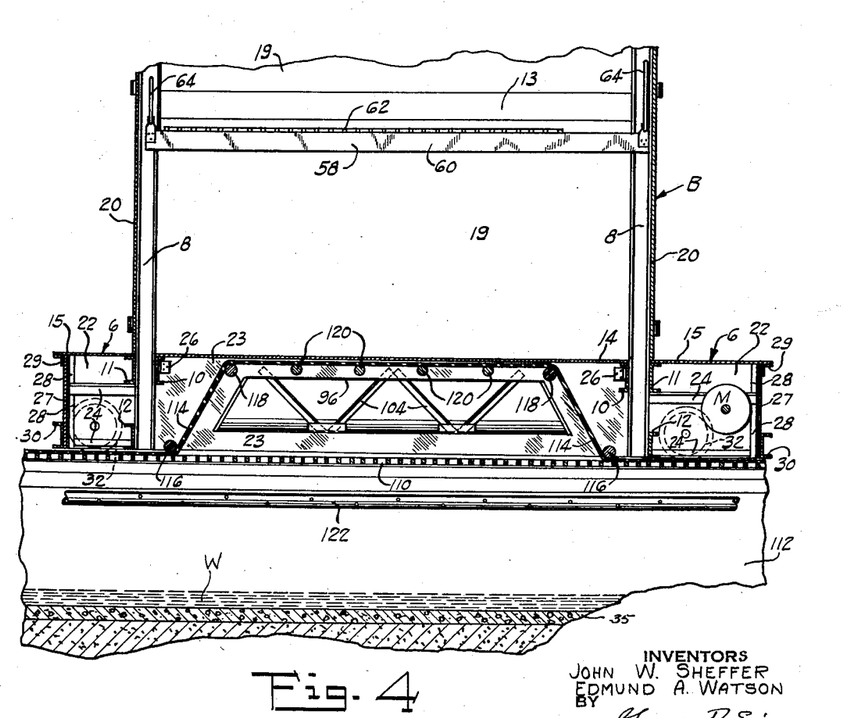
Figure 4 is a sectional view taken on line 4—4 of Figure 3.

Outwardly swinging doors 52, 54 are provided in end walls 20 for entrance to and exit from the booth, the door 52 being provided on its inside surface with a flight of rungs 56 forming a ladder permitting access to an elevator platform 58. This platform is made up of a pair of spaced side rails 60 connected together by a grille or grating 62 which terminates a sufficient distance from the end of the platform adjacent door 52 to provide an opening large enough for one to pass through when using the ladder 56 to reach and descend from the platform. The ends of the side rails 60 at the outer side of the booth are guided in upright channels 8 while at the inner side they are arranged between the pairs of spaced channels 8, as shown in Figure 3, thus preventing lateral movement of the platform but permitting its vertical movement. The elevator platform 58 is suspended by four cables 64, one being connected to each end of the side rails 60 and running through the top of the booth over roller devices 66 secured thereon. The pairs of cables at each side of the booth are wound in opposite directions on and anchored to sheaves 68 also secured to the roof of the booth and rotated by a shaft 70 provided with a gear 72. The shaft 70 is turned by means of a pulley wheel device 74 acting through the worm 76 meshing with gear 72. The pulley wheel 74 is actuated by a chain 78 extending through the roof 17 of the booth within easy reach of one standing on platform 58 for manipulation to either raise or lower the platform.

The booth is equipped with an air compressor 80 mounted on the roof and driven by electric motor M'. Pipe 82 extends from the compressor to a paint tank 81 and air tank 83 suitably mounted within the booth. Conduits 85 and 87 lead from tanks 81 and 83 to paint nozzle 89. Current for operating the compressor motor M' is obtained through power lines 91, 93 leading from trolley contact shoe 84 located on top of the booth. The trolley has sliding contact with a contact shoe 95 connected by lines 97 with power lines 86 running coextensive with the direction of travel of the booth. The booth is also equipped with an electric motor M carried within the base 6 for driving change speed gearing 101 of conventional design, connected to drive one of the wheels 32 through gearing 88 secured to the inner face thereof. The gearing has suitable controls to permit running of the booth at a predetermined and continuous rate of speed along the rails 34 during the spraying operation. Like the air compressor motor M', electric current for operating motor M is obtained through the trolley 84 and lines 91 and 93, suitable manually controlled switches S being interposed in lines 93.

The floor 14 of the booth is provided with a substantially centrally located opening extending longitudinally within the booth and covered by grid or grating 90. The inner edge of the floor 14 is cut out to form a narrow opening 92 extending longitudinally in the booth and of the same length as the grating. A chute 94', preferably secured integral with lower plate 94, is secured around the outer edges of and below the grating 90 and cut-out floor portion 92 and secured around and encompassing openings 96 formed in truss plates 23. The space between the upper edge of the plate 94 and the lower side wall of the car being sprayed is regulated by a lower adjustable profile plate 98 similar to the upper adjustable profile plate 46. The plate 98 is slidable in guideways 100 on the lower projecting wall portions 40 and like plate 46 is adjustable to accommodate varying contours by means of a pin 102 which is passed through aligned holes in the plate and guideways. The plates 23 are reinforced at the openings 96 by braces 104 and the bottom edges of the plates are provided with angle members 105 carrying wooden strips 107 on which flexible sealing strips 106 are fastened. These sealing strips are arranged to slide in contact with upstanding members 109 fixed along the outside of angle members 110 projecting into the inlet neck 111 of discharge trough 112 underneath and extending the length of rails 34. Secured across the neck and fixed on members 110 are spaced bars 113 forming a grille on which rests a running valve formed of a flexible strip or belting 114 formed of synthetic rubber or similar material. The belting also rests along its side edge portions on seating strips 103 secured on angle members 110 for normally closing the opening 111 leading to the larger area trough 112. The angle members 110 are in turn welded to angle supports 113' fixed on the flooring 35 and partially overlying the trough neck. The flexible valve strip 114 has its ends suitably anchored or fastened beyond the ends of the neck 111 and is threaded under hold-down rollers 116 at opposite interior ends of the booth and up and over pickup rollers 118 and carrier rollers 120 under the floor 14 and between the spaced plates 23 on which all of the rollers are journalled. The flexible strip 114 is thus raised or lifted substantially the full length of the booth as it moves in either direction to uncover that portion of the opening 111 leading to trough 112 and thereby automatically maintaining constant communication between the interior of the booth and discharge trough 112. In other words, the flexible strip 114, normally seated by gravity and suction in the trough, provides a running valve between the neck of the discharge trough and the booth outlet consisting of floor grating 90, chute 94' and floor opening 92.

Figure 5:
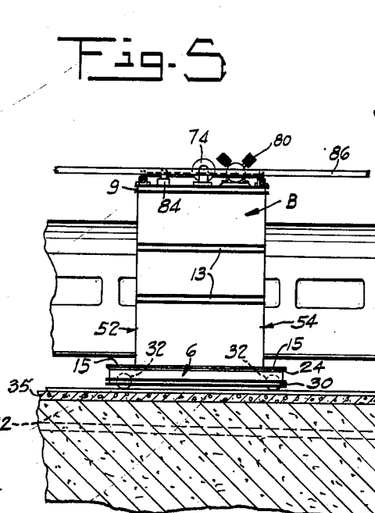
Figure 5 is a view taken on line 5—5 of Figure 1 showing the booth and other parts of the system in side elevation.
Figure 6:
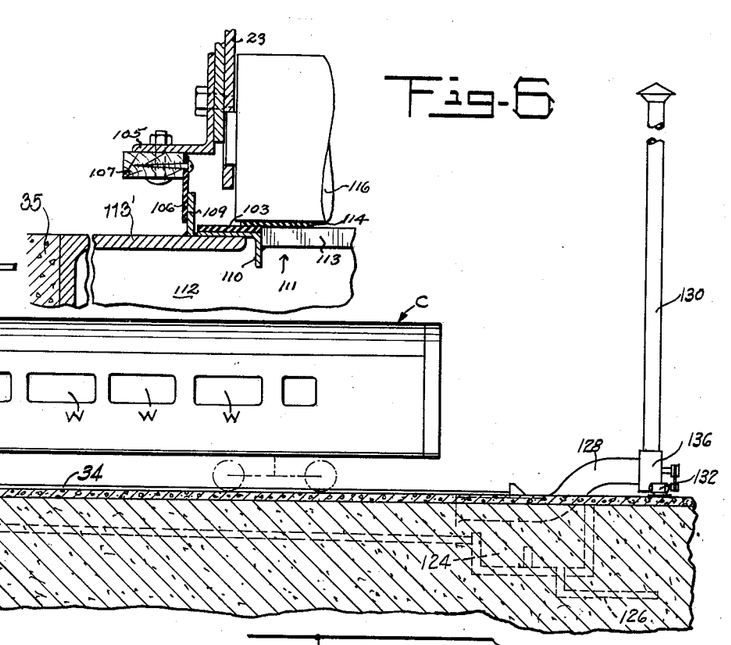
Figure 6 is an enlarged fragmentary sectional view of the booth and valve structure in the circle on Figure 2.
Figure 7:
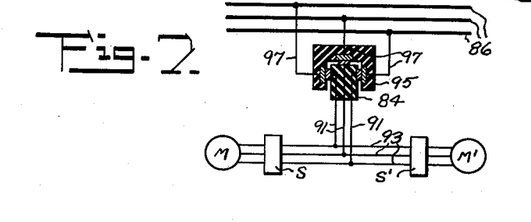
Figure 7 is a diagram of the power connections for the drive and compressor motors.
Figure 8:
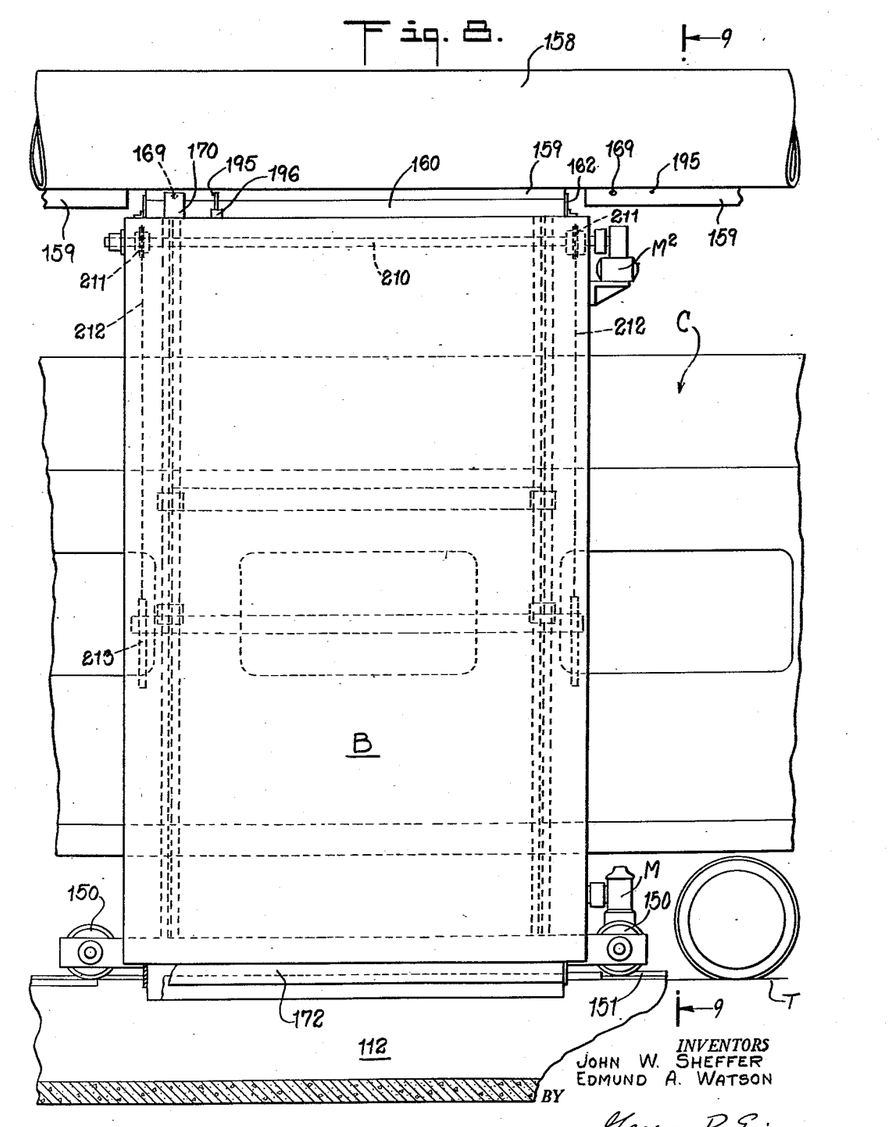
Figure 8 is a fragmentary side elevation of a modified form of painting system.
Figure 9:
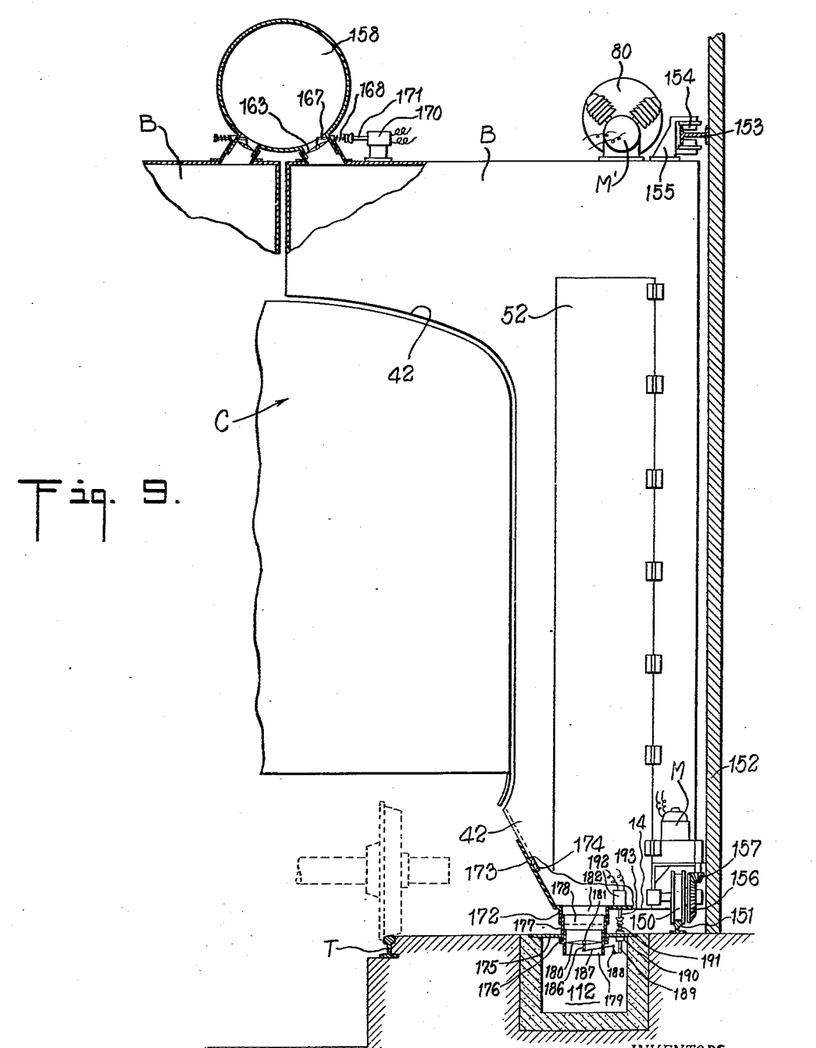
Figure 9 is a cross-sectional view of the modified form of painting system taken on line 9—9 of Figure 8.

The bottom of the discharge trough 112 slopes downwardly toward the outlet, as more clearly shown in Figure 5, and spray pipes 122 extend longitudinally in the trough under the neck and are connected with a suitable source of water pressure. At the lower end of the trough a drainage basin 124 is connected with a sewer or other disposal pipe 126. Also at this end of the trough 112 is an air exhaust conduit 128 leading to an exhaust stack 130 in which is a fan 136 driven by a motor 132.

Figure 1:
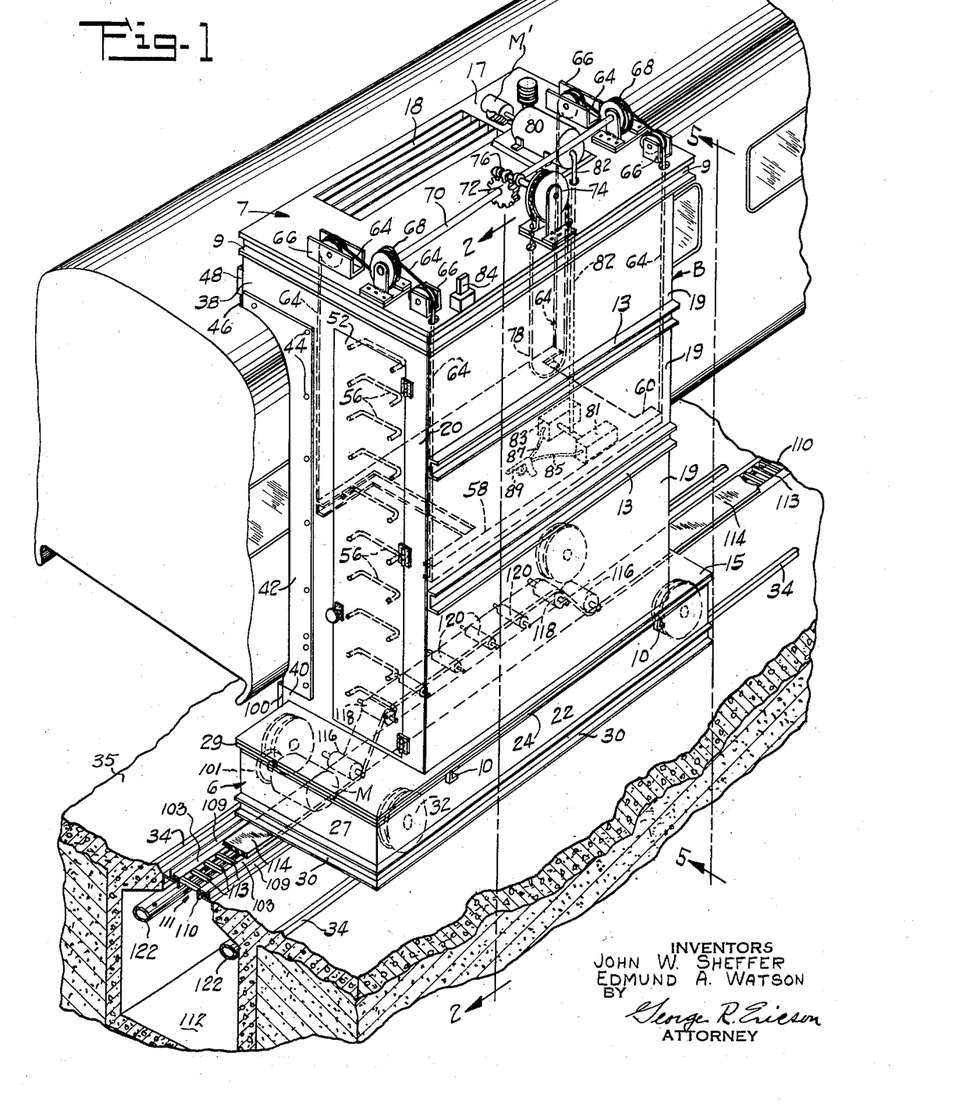
Figure 1 is a perspective view showing the system installed for use in spraying a railway car.
Figure 2:
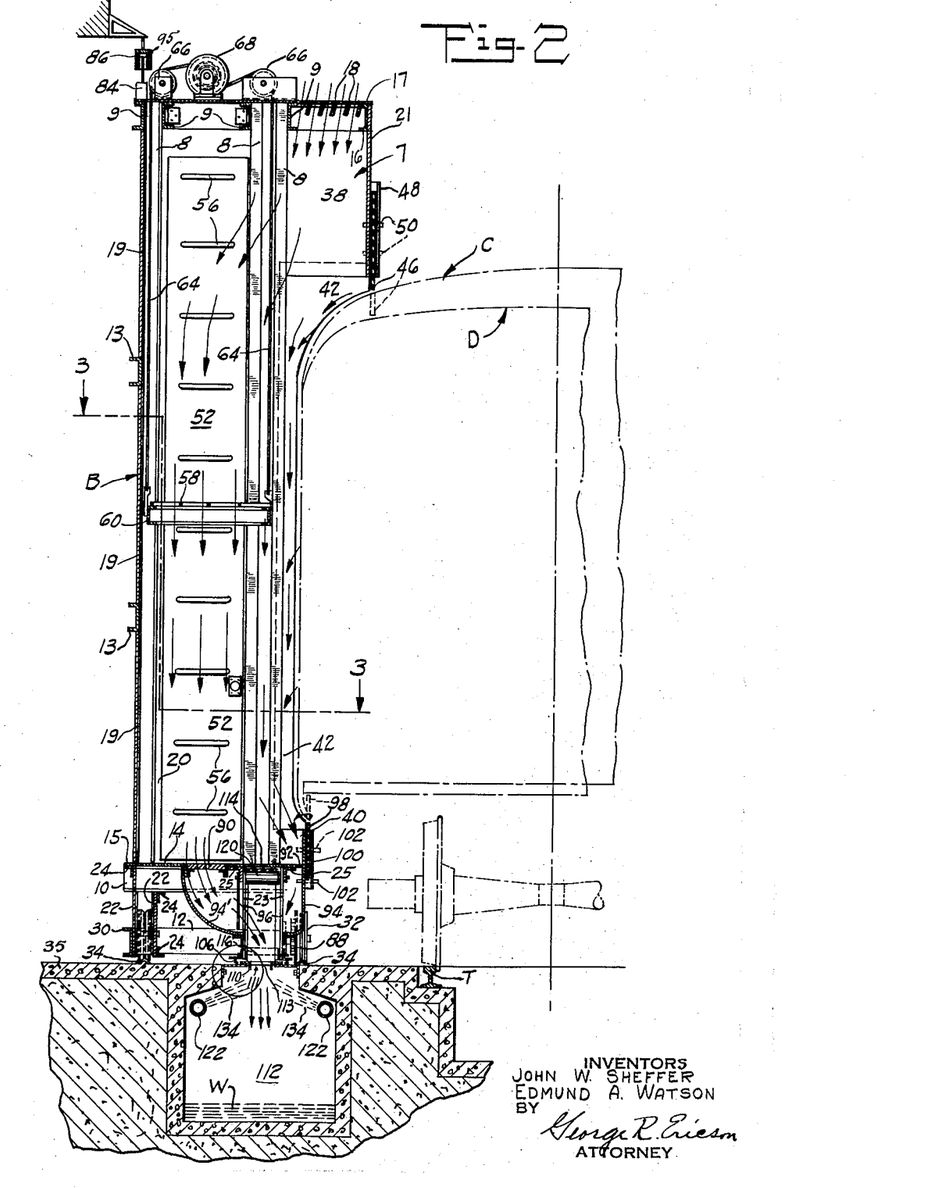
Figure 2 is a cross-sectional view through the system taken on line 2—2 of Figure 1.

The air drawn by the fan enters the booth through the space between the profile plates 42, 46 and 98 and the adjacent surface of car C, as indicated by the arrows in Figure 2, and also through louvres 18 in roof 17 if additional air is required. Air, paint overspray and fumes can flow through the grille elevator platform 58, floor grating 90, floor cut-out portion 92 and chute 94' and through neck 110 into the discharge trough 112 where it passes through water from spray pipes 134. The fan is of such power as to produce air flow of sufficient velocity and volume to create a negative pressure or suction in the trough 112 and in the booth. This negative pressure draws air into the booth from the space between the profile plates and the car thereby preventing escape through such space of paint overspray and fumes. Also, the overspray and fumes in the booth are moved into the discharge trough and the flexible valve strip 114 is held closed over opening 111 outside of the booth. The water from spray pipes 134 cleanses the air of overspray particles of pigment or the like while moving at a relatively high velocity and carries them into the water W with which they are drained off through the disposal pipe 126. The air is thus free of such overspray before reaching the fan, avoiding clogging thereof and contamination of the outside atmosphere.

It will be seen that a spraying system has been provided in which the spray is confined substantially to the area of application and the overspray completely and quickly exhausted. A novel running exhaust valve connection has been provided for a moving booth insuring continuous communication between the booth and exhaust outlet during movement of the booth along an object being painted. Further, the booth is adapted to carry all necessary spraying apparatus together with its operators and to be run at a continuous and controlled rate of speed whereby an uninterrupted spray application may be made simultaneously to both upper and lower portions of a railway car or other vehicle. In addition, the booth is adapted for use in spraying vehicles of various contours and sizes. For example, if it is desired to spray a car D as shown in Figure 2 of different size and shape than car C, the detachable profile plates 42 are replaced by other profile plates of the proper contour and size, and the profile plates 46 and 98 are adjusted to give a uniform spacing between the vehicle surface and the perimeter of the opening in the side of the booth. This spacing of the open side of the booth from the surface area being sprayed provides an air inlet and seal preventing escape of overspray and fumes around the perimeter of the open side because air drawn into the booth through the space between the perimeter and the surface area will continuously carry the overspray and fumes to the air outlet chute. This spacing will normally supply a sufficient volume of air so that in most instances the air supply from air inlet louvres 18 can be dispensed with. The spraying operation is thus not only reduced in cost due to the adaptability of the system, but it is also considerably speeded up by making possible continuous and simultaneous spray application to both upper and lower portions of the car.

The booth is also adapted for use in spraying the interior of the car or other vehicle. The usual blanking plates used to mask the windows W during the exterior spraying operation are removed and the booth positioned with its open side encompassing the window openings. The overspray and fumes are drawn from the vehicle interior through the window opening into the booth from which they are exhausted in the same way as when spraying the vehicle exterior. The booth is readily movable from one window opening to the next as the spraying operation progresses, making possible a substantially continuous and uninterrupted spray application to the vehicle interior.

In the modified form of the invention, as shown in Figures 8 to 11 of the drawings, the exhaust control, booth mounting and auxiliary air inlet differ from the construction previously described. In this form of the invention the booth is intermittently driven and stops at adjoining areas along the car for painting operations, instead of being continuously driven as in the previously described form of the invention. Reference characters will be applied to indicate similar structure in both forms of the invention.

In the modified form of the invention, spray booth B is carried on a pair of wheels 150 which roll on track 151 outside of the exhaust trough 112 and in parallel relation with the car rails T. Wall 152, or some similar suitable support, provides a mounting for an H-guide beam 153 that is engaged by stabilizer rollers 154 carried on brackets 155 fixed on the roof of the booth. One of the wheels 150 is driven by gear 156 which is fixed thereto, and drive gear 157 meshing with gear 156 is driven by electric motor M.

Figure 10:
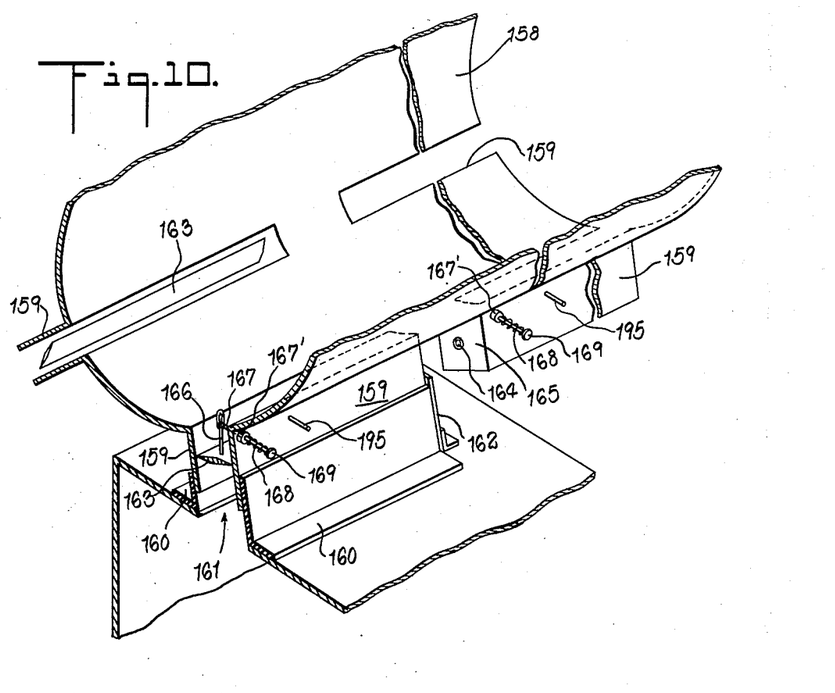
Figure 10 is a fragmentary perspective view of the air inlet and control in the modified form of the invention.

The profile plates and booth structure in this form of the invention can be similar to that previously described. Instead of the auxiliary air inlet louvers in the roof of the booth previously described, this form of the invention provides for utilizing air from outside of the shed in which the cars are to be spray painted. For this purpose, an air inlet manifold 158 extends longitudinally above the cars with an outside inlet and suitable means for moving air therethrough. Longitudinally spaced outlet branches 159, open at the bottom, depend from the manifold and are similarly spaced and of similar length. The roof of the booth is provided with an air inlet neck for engagement in sealed connection with the manifold outlet branches when aligned therewith. The neck is formed of a pair of spaced angle members 160 secured one on each side of slot 161 in the roof and flaps 162 extending across the ends of the angle members. The neck angle members and the flaps can be formed of flexible material, having sufficient body to maintain a firm engagement with the sides and ends of the manifold branches, when aligned therewith, to seal the connection. The inlet neck on the roof is substantially the same length as the manifolds and the upstanding portions of the angle members 160 bear against the sides of the manifold branches, while the end flaps 162 serve to seal the space in the ends of angle members 160 between the ends of the angle members and the ends of the manifold branches. As the booth moves along, the flexible end flaps will ride over the manifolds. It will be noted that the air inlet necks are of less length than the interior of the booth so that there will be overlapping of the car surface areas by the booth opening at the stations of paint spraying.

In each manifold branch is arranged a coextensive valve 163 having integral shaft members 164 projecting from its ends and rotatably mounted on the end walls 165 of the manifold branches. These valves 163 are adapted to be rotated by linkages each consisting of a slotted arm 166 and a rod 167, the rod extending through bearing 167' in a side wall of the manifold and having its inner end extending through the slot in arm 166. Coil spring 168 is interposed between the bearing and a head 169 on the outer end of rod 167. Such spring normally acts against the head 169 to hold the linkage in valve closing position. Solenoid 170 is mounted on the roof of the booth and includes a plunger 171 adapted to bear against the head of rod 167 for the purpose of moving the rod inwardly of the manifold branch to thereby shift arm 166 in a direction to rock the valve into open position when the solenoid is energized. The rods 167 are so located relative to the manifold branches 159 that the air inlet neck will progressively register with the manifold branches when the booth is stopped with the solenoids in operative position with the rods.

The base 14 of the booth along the open side facing the car, is formed with a side discharge recess which is covered by a flexible outlet neck structure having depending sides 172, ends 182 and an upstanding flange 173 that seals against a flange 174 extending lengthwise between the lower ends of end profile plates 42. This discharge neck has considerably less area than the floor 14 and is of less length than the floor.

The exhaust valve arrangement is generally of the same type as the auxiliary air inlet valve arrangement. The discharge trough 112 lies lengthwise beneath the path traveled by the booth and forms a manifold with upstanding inlet branches located coextensive with the air inlet branches of the manifold 158. A slotted plate 175 is secured across the open top of trough 112 and flanges 176 depend from the plate at the sides of the slots. The inlet branches each comprise side plates 177 and end plates 178 secured to the floor plate in relation to surround the slot. The branches are each provided with an extension 179 depending therefrom in which a valve 180 is located, such valve being pivotally mounted on stub shafts 181 extending through the end walls of extension 179.

The valves are each operated by a solenoid actuated linkage. Each of such linkages includes arm 186, link 187 and bell crank 188. Plunger 189 extends through bearing 190 projecting through flooring 14 and is urged upwardly by coil spring 191. Solenoid 192 is mounted on the floor of the booth and actuates plunger 193. When the booth is stopped at a paint spray station, the plunger 193 registers with plunger 192 and upon energizing the solenoid will depress plunger 192 to actuate the associated linkage to open valve 180 connected thereto. The arrangement is preferably such that the valves in the corresponding inlet manifold branches and the discharge manifold branches will be actuated simultaneously.

Provision is also made for stopping the booth in successive progressive positions to align the solenoid plungers with the valve operating plunger and in which positions the manifold inlet and discharge branches are connected with the interior of the booth but sealed to the atmosphere adjacent the car being spray painted. To this end, each intake manifold branch has a cut-out contact 195 adapted to be engaged by a cut-out relay switch 196 on the booth.

Figure 11:
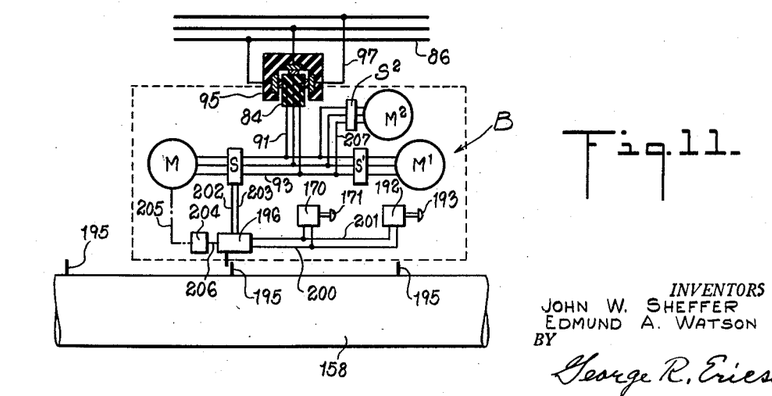
Figure 11 is a power diagram for the electric driven apparatus in the modified form of the invention.

Referring to Figure 11 of the drawings, the diagram shown therein is also employed with this form of the invention. In addition thereto, the solenoids 170 and 192 are connected with cutout switch 196 by lines 200, 201 and the cut-out switch is connected by lines 202, 203 with the drive motor switch S. Also, a resetting relay 204 is connected with motor M and the cut-out switch 196 by lines 205, 206. Thus, operation of the resetting switch will allow the motor M to start and the solenoids to be de-energized until the booth reaches the next station of paint spray operation.

The electric system wiring 93 is also connected to motor M² by lines 207 in which is arranged a control switch S². This motor is mounted on one end of the booth and is connected to drive shaft 210 extending across the top interior of the booth and carrying sprockets 211. In this form of the invention the vertically adjustable platform 58 is supported by one end of chains 212 extending over sprockets 211, the other ends of the chains having suitable counter-weights 213 attached thereto. The control switch S² is located interiorly of the booth in position to be operated by painters standing on the platform. The switches S, S', 196 and 204 are likewise located interiorly of the booth in positions to be actuated by painters standing therein.

Each type of booth, which is closed except for a side opening, is driven along the side of the car at a selected speed during the painting operation with the exhaust fan 136 operating at a constant speed. The opening in the booth through which the operator spray paints the car wall is defined by the profile plates 42, 46 and 94 and such plates are slightly spaced a uniform distance from the adjacent car wall to provide a surrounding space for the entry of air necessary to discharge the overspray paint and fumes from the booth as they develop. Escape of overspray paint and fumes through the air entry space is prevented and efficient continuous discharge of overspray and fumes from the booth is accomplished by control of the velocity of the air as it enters the booth, as it passes through the booth and as it discharges from the booth. The area of the discharge opening 92 in the floor of the paint spray booth is substantially the same as that of the air inlet area between the profile plates and the car side so that there is a pressure balance between such areas. The velocity of the air passing through the entry space between the booth opening and the adjacent car side induced by fan 136 is sufficient to prevent escape of overspray paint and fumes through the air entry space. As the area of such air entry space and the outlet opening 92 are similar and considerably less than the area within the booth, the air velocity is considerably reduced in passing through the booth. The air velocity in the booth is thus made low enough in order not to blow the paint spray leaving the nozzle away from its intended direction and to entirely assimilate and carry therewith all overspray and fumes from the booth as it flows continuously throughout the booth to the exhaust conduit. In order to cause continuous air flow through the booth without static portions, the inlet neck of the exhaust conduit and booth outlet opening are of considerably less area than the area of the booth and thereby increasing air flow velocity between the booth outlet and the main portion of the exhaust conduit. Thus, the air moves slowly but continuously through the entire interior of the booth to entirely carry off the overspray and fumes as developed. The higher velocity air leaving the booth outlet opening is washed by water from pipes adjacent its entry into the exhaust conduit to thereby cause paint pigment and fumes to separate more efficiently from the air before encountering the exhaust fan 136. With this method of air velocity control, overspray and fumes will be confined entirely within the interior of the booth, overspray and fumes will be removed without accumulating or lagging in areas adjacent the walls of the booth and the air exhausted from the system will be substantially clean.

The invention may be modified in various respects as will occur to those skilled in the art and the exclusive use of all modifications that come within the scope of the appended claim is contemplated.

What is claimed is:

In a system for spray painting the exterior surfaces of railway cars, a pair of spaced-apart rails alongside said cars coextensive with and parallel thereto, a spray booth having a base portion, a floor over the base portion, an outside wall, end walls and a roof forming with said floor an open inner side of the booth adjacent to and spaced from the exterior surfaces of said cars, said base portion of the booth projecting beyond the end walls thereof and having wheels mounting said booth on said rails for travel alongside the cars to be spray painted, an air outlet in the floor of said booth, an air discharge trough having an elongated opening beneath and between said rails, means for maintaining sub-atmospheric pressure in said discharge trough, flexible continuous valve means normally covering the trough opening and held closed thereover beyond the confines of the booth by the lowered air pressure within said trough, said flexible valve means having a section thereof extending into the base portion of said booth, and means in the base portion of said booth adjacent said air outlet below the floor of said booth for supporting and progressively lifting said section of the flexible valve means from that portion of the trough opening beneath the booth as it travels along the rails during the spraying operation whereby to exhaust overspray and fumes incident thereto from said booth through said air outlet into said air discharge trough.

(References on following page)

References Cited in the file of this patent

UNITED STATES PATENTS

| | | |
|---|---|---|
| 704,808 | Kress | July 15, 1902 |
| 2,081,742 | Glaze | Mar. 25, 1937 |
| 2,132,826 | Ludwig | Oct. 11, 1938 |
| 2,137,862 | Steins | Nov. 22, 1938 |
| 2,425,940 | Iverson | Aug. 19, 1947 |
| 2,496,209 | Hemming | Jan. 31, 1950 |

FOREIGN PATENTS

| | | |
|---|---|---|
| 19,838 | Great Britain | Oct. 2, 1905 |
| 462,135 | Germany | July 5, 1928 |